United States Patent [19]

Slat

[11] Patent Number: 4,662,528
[45] Date of Patent: * May 5, 1987

[54] BLOW MOLDED PLASTIC CONTAINER HAVING PLASTIC LABEL

[75] Inventor: William A. Slat, Brooklyn, Mich.

[73] Assignee: Plastipak Packaging, Inc., Plymouth, Mich.

[*] Notice: The portion of the term of this patent subsequent to Mar. 4, 2003 has been disclaimed.

[21] Appl. No.: 833,037

[22] Filed: Feb. 26, 1986

Related U.S. Application Data

[63] Continuation-in-part of Ser. No. 750,065, Jun. 28, 1985, Pat. No. 4,573,596, which is a continuation of Ser. No. 433,536, Oct. 8, 1982, abandoned.

[51] Int. Cl.⁴ ............................................. B65D 23/08
[52] U.S. Cl. ................................... 215/12 R; 220/450
[58] Field of Search ..................... 215/12 R; 220/450

[56] References Cited

U.S. PATENT DOCUMENTS

| | | |
|---|---|---|
| 4,183,441 | 1/1980 | Erlandson . |
| 4,210,259 | 7/1980 | Schrecker ........................... 206/455 |
| 4,219,124 | 8/1980 | Amberg . |
| 4,315,573 | 2/1982 | Bradley et al. . |
| 4,342,399 | 8/1982 | Stirling . |
| 4,457,450 | 7/1984 | Smith et al. ......................... 220/455 |
| 4,479,770 | 10/1984 | Slat et al. . |
| 4,479,771 | 10/1984 | Slat et al. . |
| 4,573,596 | 3/1986 | Slat ..................................... 215/12 R |

Primary Examiner—Joseph Man-Fu Moy
Attorney, Agent, or Firm—Brooks & Kushman

[57] ABSTRACT

A blow molded plastic container (10) disclosed includes at least one plastic label (L) on a side wall (12) which has abruptly curved portions (42,44,46) that provide a generally continuous outer surface at the junctions of the label edges with the side wall. The plastic label (L) may have different constructions for resisting the transmission of fluids through the container side wall and for providing a heat activated bond that secures the label to the container side wall during the blow molding process. Different preferred plastics utilized to provide the barrier include polyvinylidene cloride, polypropylene, polyethylene, ethyl vinyl alcohol, acrylonitrile, and polyethylene terephthalate which may be used singly or with multiple types either dispersed within each other or in separate layers. The heat sensitive adhesive may be applied as a coating to the inner surface of the plastic label, dispersed within the plastic of the label, or provided by the inner surface of the label plastic that also functions as the barrier. Best results are achieved when a pair of the labels (L) are provided on oppositely facing sides of the container side wall (12) so as to more fully cover the container and thus increase the resistance to the transmission of fluids.

10 Claims, 9 Drawing Figures

BLOW MOLDED PLASTIC CONTAINER HAVING PLASTIC LABEL

CROSS REFERENCE TO RELATED APPLICATION

This application is a continuation-in-part of pending prior application Ser. No. 750,065 which will issue on Mar. 4, 1986 as U.S. Pat. No. 4,573,596 which was filed on June 28, 1985 as a continuation of prior application Ser. No. 433,536 which was filed on Oct. 8, 1982 and is now abandoned.

TECHNICAL FIELD

This invention relates to a container having improved resistance to the transmission of fluids such as liquids, vapors of the liquids, or other gases.

BACKGROUND ART

One problem with plastic containers designed to hold liquids is that the containers are permeable to certain liquids, to gas vapors of the liquid, and to other gases.

One specific example of the fluid transmission problem mentioned above involves plastic containers made from polyethylene terephthlate used to hold carbonated beverages. Transmission of $CO_2$ through the polyethylene terephthalate containers results in a loss of the carbonization and thus limits the shelf life of the container. Another specific problem involves liquor containers made from polyethylene terephthalate which is also permeable to $H_2O$ such that transmission of $H_2O$ of the liquor outwardly through the container reduces the volume of the container contents and simultaneously increases the proof level. Likewise, other plastics which have good resistance to the transmission of certain fluids are permeable to other fluids. For example, the transmission of $O_2$ into a plastic container affects flavor, color, and bacteria growth of food contents.

In order to overcome the fluid transmission problem mentioned above, one approach has been to coat the plastic container with a barrier material such as polyvinylidene cloride (PVDC). Such a coating has previously been applied by a dip method to the exterior of the container; however, it has been found that this results in the fluid contents causing blistering of the coating and a consequent unsightly appearance as well as allowing the loss of some fluid contents. This outside coating also results in additional time and labor as well as problems involved with providing an even distribution of the coating.

In addition to the outside coating mentioned above, inside coating of the container with the barrier material has also been considered. However, such inside coating is difficult to perform and requires increased drying time. Furthermore, the inside coating can result in flaking of the coating and consequent contamination of the container contents as well as requiring the additional time and labor involved with the exterior coating.

Plastic sleeves have also been used over platic containers such as shown in U.S. Pat. Nos. 4,183,441; 4,219,124; 4,315,573; and 4,342,399 to provide labelling, seam strengthening, upright support of an unstable container, strengthening, and the resistance of fluid transmission by the use of a metal foil of the sleeve. However, such sleeves due to the cost involved and other reasons have never found widespread acceptance.

Plastic blow molding on a commercial level has recently incorporated the use of in-mold labelling to provide labelling of containers such as shown by U.S. Pat. Nos. 3,108,850; 3,207,822; 3,292,209; 3,324,508; 3,608,020; 3,801,689; 3,986,807; 4,355,967; 4,359,314; 4,397,625; 4,479,770; 4,479,771; 4,479,644; 4,498,854; and 4,501,548. This in-mold labelling is performed by applying a label to the interior of the mold prior to the plastic blow molding process. The resultant blow molded article is then blown around the label and advantageously eliminates the necessity for a post labelling operation as has been required in the past. However, such in-mold labelling has not previously been capable of reducing the transmission of fluids through the container side wall.

DISCLOSURE OF INVENTION

An object of the present invention is to provide an improved container for reducing the transmission of fluids through the container side wall. In carrying out this object, the container is disclosed as being manufactured by an in-mold labelling operation during a plastic blow molding process so as to eliminate the necessity for any subsequent labelling after the blow molding and to also rduce the transmission of fluids through the container.

A container constructed in accordance with the invention includes a plastic side wall and at least one plastic label of a uniform thickness on the side wall. The plastic label has an outer surface that faces outwardly and an inner surface that faces inwardly toward the side wall. The label extends partially around the side wall and has side edges spaced from each other as well as having upper and lower edges that extend between the side edges. Abruptly curved portions of the container side wall adjacent the edges of the label provide smooth junctions between the container side wall and the outer surfaces of the label at the label edges. The label is made of a plastic that provides a barrier resistant to the transmission of fluids. A heat sensitive adhesive secures the inner surface of the plastic label to the container side wall.

As mentioned above, the container is disclosed as being made by an in-mold labelling process during a plastic blow molding operation. This blow molding process forms a parison around the plastic label which is initially positioned within the mold to provide the abruptly curved portions at the label edges in order to thereby provide the generally continuous outer container surface at the junctions of the resultant side wall with the label edges. During the blowing, the heat involved activates the adhesive to permanently secure the label to the container side wall such that the barrier plastic of the label is capable of continually resisting the transmission of fluids through the side wall.

The plastic label is preferably made from a plastic selected from the group consisting of polyvinylidene cloride, polypropylene, polyethylene, ethyl vinyl alcohol, acrylonitrile, or polyethylene terephthlate. A single type of these plastics may be used to make the plastic label resistant to the transmission of certain types of fluids. The plastic label may be made from substantially only one type of plastic to provide the barrier for resisting the transmission of fluids. Alternatively, the plastic label may be made from more than one type of plastic, either by a dispersion of the different types of plastic within each other or by separate layers of the different plastics, to thereby provide the barrier for resisting transmission of different types of fluids through the label.

The heat sensitive adhesive is disclosed in one embodiment as being applied as a coating to the inner surface of the plastic label so as to adhere the label to the container side wall. In another embodiment, the heat sensitive adhesive is dispersed within the plastic of the plastic label. The plastic of the label for providing the label barrier can also function as the heat sensitive adhesive at the inner surface of the label. This is one for which polyvinylidene cloride is particularly suited.

While a single label will decrease the transmission of fluids through the container side wall, it is difficult to blow mold a container with a label on more than one-half of the container side wall, and a pair of labels are most preferably utilized located on oppositely facing sides of the contianer side wall to thereby provide increased label coverage over the side wall and less unlabelled area through which transmission of fluids is possible.

The objects, features, and advantages of the present invention are readily apparent from the following detailed description of the best modes for carrying out the invention when taken in connection with the accompanying drawings.

BEST MODES FOR CARRYING OUT THE INVENTION

Figure 3:
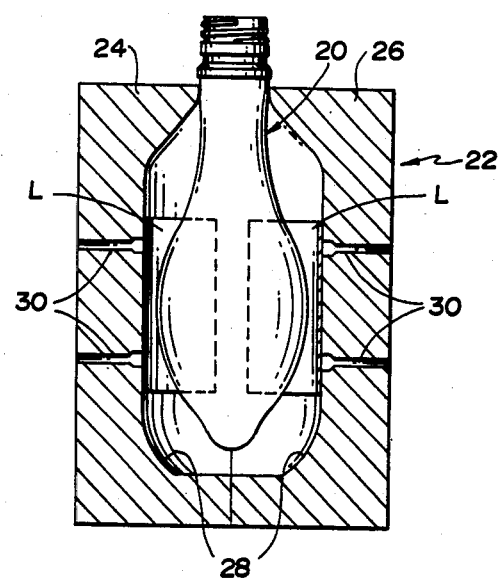
FIG. 3 illustrates the mold after closure thereof and a partial blowing of the parison during blow molding process.
Figure 4:
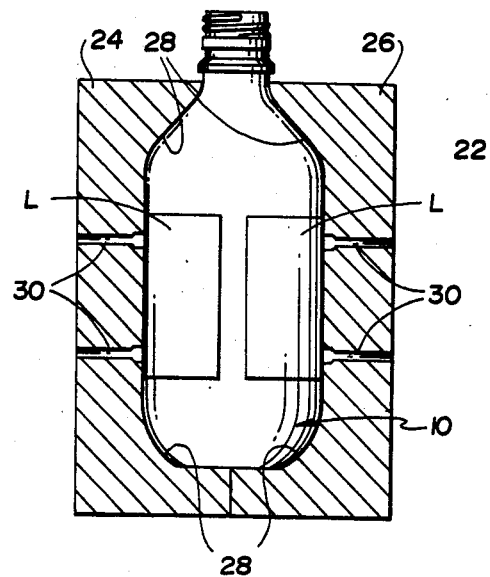
FIG. 4 illustrates the closed mold after completion of the blowing step of the blow molding process.
Figure 5:
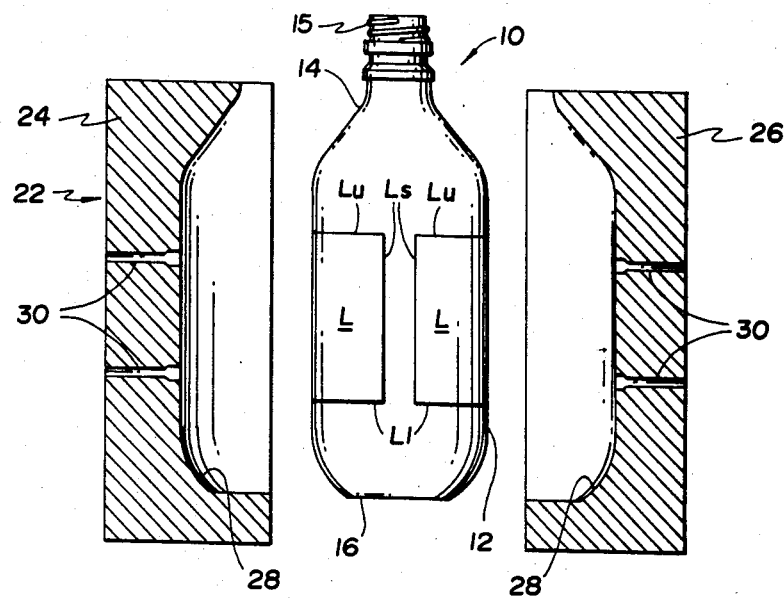
FIG. 5 illustrates the mold after the blown container has cooled sufficiently to permit mold opening for ejection of the blow molded container.
Figure 6:
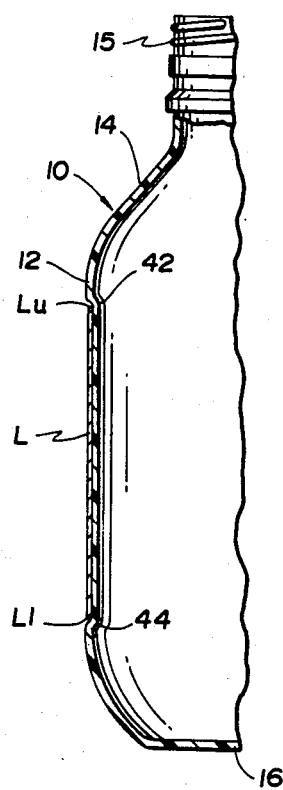
FIG. 6 is an elevational view taken partially in section through the container of the invention.
Figure 7:
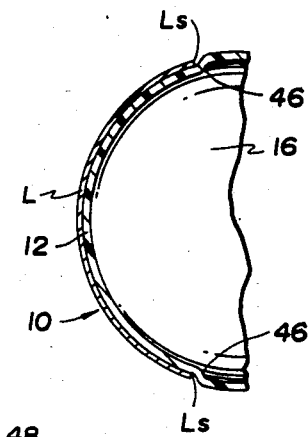
FIG. 7 is a partial plan view taken in section through the container.

With reference to the drawings, plastic blow molding apparatus illustrated in FIGS. 1 through 4 performs an in-mold labelling operation and is utilized to manufacture a labelled container 10 constructed in accordance with this invention as illustrated in FIGS. 5 through 7. This container 10 includes plastic labels L permanently adhered thereto to prevent the transmission of fluids through the container either inwardly or outwardly. Plastic labels L of different constructions may be used to prevent the transmission of fluids in order to maintain the integrity of the contents after the initial filling of the container.

As illustrated in FIGS. 5 through 7, the container 10 has a side wall 12 that is illustrated as having a generally cylindrical shape in the disclosed embodiment. An upper neck 14 of the container extends upwardly from the side wall 12 to a spout 15 which is illustrated as being of the threaded closure type. A bottom 16 of the container extends downwardly from the side wall to close the container. As illustrated, a pair of the labels L are provided on oppositely facing sides of the container side wall 12 between the upper neck 14 and the bottom 16. While it is preferable to utilize a pair of the labels in order to decrease the unlabelled area through which fluid transmission is possible, a single label will reduce the transmission of fluids and thereby provide the container with a greater shelf life than is otherwise possible.

Figure 2:
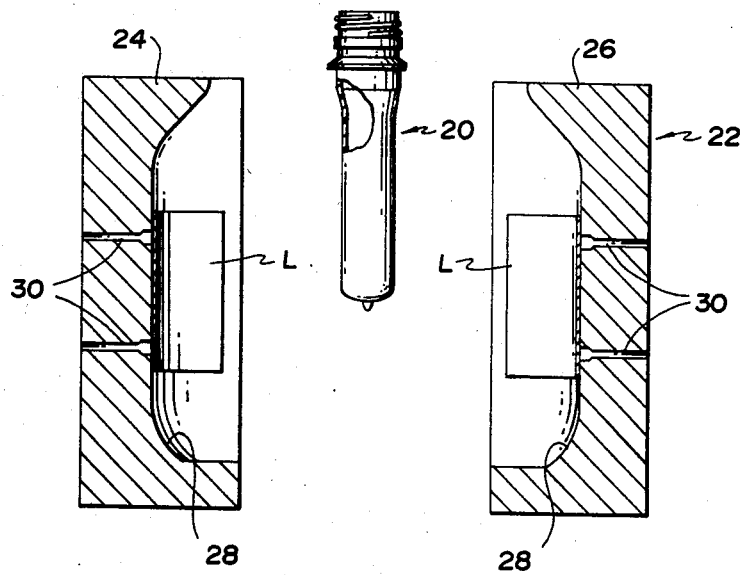
FIG. 2 illustrates a parison that is positioned between the mold sections of the labelled mold in the open position in preparation for the blow molding process.

With reference to FIG. 2, the container is illustrated as being made from a heated plastic parison 20 that is illustrated as being of the injection preform type previously made by associated plastic injection molding equipment of the blow molding machine. However, it should be appreciated that the invention is also applicable to blow molding where the parison is made by extrusion or otherwise. The heated parison 20 illustrated is moved to the open mold 22 between the mold sections 24 and 26 in alignment with the mold cavity sections 28. Vacuum passages 30 in the mold cavity sections 24 and 26 allow for securement of the plastic labels L which are deposited in the cavity sections 28 by an initial labelling operation.

Figure 1:
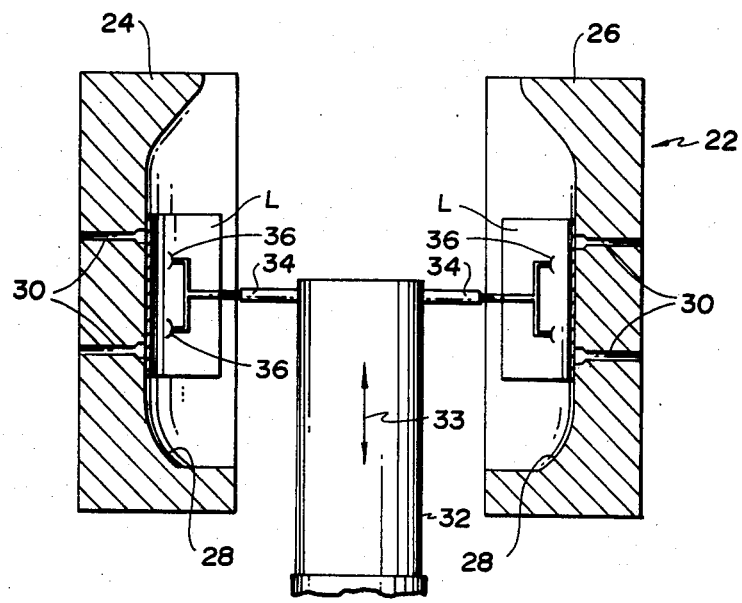
FIG. 1 is a sectional view through an open mold of a blow molding machine and is illustrated with a pair of labels being applied thereto in preparation for a blow molding process that provides a container constructed in accordance with the present invention.

As illustrated in FIG. 1, the labelling operation is performed by a label dispenser 32 that is movable along the direction of arrow 33 between a withdrawn position and an inserted position as illustrated with respect to the open mold 22. Label carriers 34 are provided with vacuum passages extending to vacuum cups 36 utilized to secure the labels L. Retraction and extension of the label carriers 34 in a direction transverse to the direction of arrow 33 provides an initial transferring of the labels from associated label magazines to the vacuum cups with the label dispenser 32 in the withdrawn position which is not illustrated. After the initial label securement, the label carriers 34 are retracted and the label dispenser 32 is then moved to the inserted position where extension of the label carriers and termination of the vacuum drawn at vacuum cups 36 allows the vacuum down at the mold passages 30 to secure the labels in position. It is also possible to provide the vacuum cups 36 with a blast of positive pressure air that assists in releasing the labels. Retraction of the label carriers 34 and movement of the dispenser 32 to the withdrawn position in preparation for the next cycle is then followed by movement of the injection molded preform 20 to the position of FIG. 2 as previously described in alignment with the mold cavity sections 28.

The blow molding process proceeds from the FIG. 2 stage to the stage shown in FIG. 3 as the mold 22 is closed by movement of the mold sections 24 and 26 toward each other to enclose the parison 20 within the cavity 28. Pressurized gas is then blown into the interior of the parison 20 to stretch the molten plastic in both axial and circumferential directions. It is also possible to initially axially stretch the parison 20 by a push rod to provide increased biaxial orientation that enhances the strength of the resultant container. The preform 20 thus moves downwardly and outwardly as illustrated to respectively provide the axial and circumferential stretching during the blow molding toward the final shape.

As illustrated in FIG. 4, the blowing stage of the processing is completed when the resultant container 10 assumes the shape of the mold cavity 28 after having been blown around the plastic labels L. The blown container is maintained within the closed mold 22 for a sufficient period of time to permit cooling of the container in the designed shape.

As illustrated in FIG. 5, opening of mold 22 by movement of the mold sections 24 and 26 away from each other allows the blown container 10 to be ejected with the labels L secured thereto as is hereinafter more fully described. Thereafter, another pair of labels L are applied to the cavity sections 28 of the mold in the manner previously described as the next cycle commences.

As illustrated in FIGS. 5, 6, and 7, each plastic label L has a uniform thickness including an outer surface that faces outwardly and an inner surface that faces inwardly toward the side wall. Each label extends partially around the side wall 12 of the blown container 10 and has side edges Ls spaced from each other in a circumferential direction. Each label L also has an upper edge Lu located below the neck 14 of the container and also has a lower edge Ll located above the bottom 16 of the container. The container side wall 12 as a result of the blowing process has abruptly curved portions 42, 44, and 46 respectively adjacent the upper, lower, and side edges of the label L to provide the container with a generally continuous outer surface at the junctions of the label edges with the side wall. As is hereinafter more fully described, the plastic of each label L provides a barrier for resisting the transmission of fluids through the container side wall 12 and the inner label surface has a heat sensitive adhesive that secures the label to the container side wall. The particular construction for providing the barrier and the adhesive will depend upon the particular application for which the container is to be used. However, regardless of the application, the reduction in the transmission of fluids through the container together with the continuous outer surface of the contianer side wall as a result of the abruptly curved portions 42, 44, and 46, and the economically manufacturing involved that eliminates subsequent labelling of the container provide an improved container over those previously available.

The construction of different embodiments of the plastic labels L is described below in connection with FIGS. 8 and 9. Each label and embodiment, as mentioned above, includes a barrier for resisting the transmission of fluids through the container side wall 12 and a heat sensitive adhesive that secures the label to the container side walls during the blow molding process.

Figure 8:
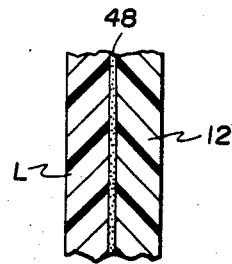
FIG. 8 is a sectional view through the container side wall and one embodiment of the plastic label.
Figure 9:
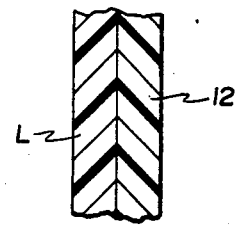
FIG. 9 is a sectional view through the container side wall and another embodiment of the plastic label.

With reference to FIGS. 8 and 9, two different embodiments are illustrated of the plastic label L which defines the inner and outer surfaces of the label and functions as the barrier against the transmission of fluids. With each of these embodiments, the plastic labels L are made from a plastic preferably selected from the group consisting of polyvinylidene cloride, polypropylene, polyethylene, ethyl vinyl alcohol, acrylonitrile, or polyethylene terephthlate. Polyvinylidene cloride has been found to give very good results in resisting the transmission of $H_2O$ and also functions well in resisting the transmission of $CO_2$ outwardly through the container as well as preventing $O_2$ from passing into the container. Polypropylene functions well in resisting the passage of $H_2O$ and thus advantageously can be utilized to prevent $H_2O$ from passing through plastic bottles made of polyethylene terephthlate to hold alcoholic beverages. While regular polypropylene functions well, it has been found that oriented polyethylene not only functions better but has better clarity if a transparent label is desired. Polyethylene will also prevent the transmission of $H_2O$ but not quite as well as polypropylene. Ethyl vinyl alcohol resists the transmission of $CO_2$ and $O_2$ better than polyvinylidene chloride but has less resistance to the transmission of $H_2O$. Acrylonitrile also functions well in resisting the transmission of $CO_2$ and $O_2$ but does not function quite as well as polyvinylidene cloride in resisting the transmission of $H_2O$. Polyethylene terephthlate has resistance to the transmission of $O_2$ but, as mentioned above, is not particularly resistant to the transmission of $H_2O$ or $CO_2$.

Each of the embodiments of the plastic label illustrated in FIGS. 8 and 9 may be made from substantially only one type of plastic to provide the barrier for resisting the transmission of fluids. It is also possible for the plastic label to be made from more than one type of plastic to provide the barrier for resisting the transmission of fluids. When more than one type of plastic is utilized, the different types of plastics can be dispersed within each other or may be provided as separate layers.

In the FIG. 8 embodiment of the plastic label L, a heat sensitive adhesive coating 48 is applied to the inner surface of the plastic label. The coating 48 of heat sensitive adhesive may be provided by a gel lacquer type heat seal which is sufficiently tacky to adhere the label to the container side wall 12 at about 70 degrees Centigrade. The parison 20 illustrated in FIG. 2 is heated to a sufficient temperature in the range of about 75 to 125 degrees Centigrade in order to have sufficient heat to activate the adhesive 48 so that the label becomes permanently adhered to the container side wall 12. It is also possible to use other heat sensitive adhesives such as polyvinylidene cloride or any other heat sensitive adhesive that will function for the particular application involved.

The plastic label L illustrated in FIG. 9 has its inner surface directly engaged with the container side wall 12 and can be manufactured in two different ways. In one version, the heat sensitive adhesive is dispersed within the barrier plastic of the label. In another version, the plastic that provides the barrier resistant to fluid transmission also functions as the heat sensitive adhesive at the inner surface of the label.

With each of the embodiments illustrated in FIGS. 8 and 9, polyvinylidene cloride is one heat sensitive adhesive that can be used primarily as the heat sensitive adhesive or as both an adhesive and the barrier for resisting the transmission of fluids. Also, polyvinylidene cloride works well to resist the transmission of $CO_2$ when the container 10 is made from polyethylene terephthlate and is designed to hold carbonated beverages.

It should be noted that certain types of plastics are not particularly adherent to each other. In such cases, the different layers of barrier plastic can be provided with an intermediate layer of a suitable adhesive film that bonds the barrier layers to each other.

While the best modes for carrying out the invention have been described in detail, those familiar with the art to which this invention relates will recognize various alternative designs and embodiments for practicing the invention as defined by the following claims.

What is claimed is:

1. A container comprising: a plastic side wall; a plastic label of uniform thickness having an outer surface that faces outwardly and an inner surface that faces inwardly toward the side wall; said label extending partially around the side wall and having side edges spaced from each other as well as upper and lower edges that extend between the side edges thereof; said side wall having abruptly curved portions adjacent the edges of the label to provide smooth junctions between the container side wall and the outer surface of the label at the label edges; said label being made of a plastic that provides a barrier resistant to transmission of fluids; and a heat sensitive adhesive that secures the inner surface of the label to the side wall.

2. A container as in claim 1 wherein the label is made from a plastic selected from the group consisting of: polyvinylidene cloride, polypropylene, polyethylene, ethyl vinyl alcohol, acrylonitrile or polyethylene terephthlate.

3. A container as in claim 1 or 2 wherein the plastic label is made from substantially only one type of plastic to resist the transmission of fluids.

4. A container as in claim 1 or 2 wherein the plastic label is made from more than one type of plastic to resist the transmission of fluids.

5. A container as in claim 1 or 2 wherein the adhesive is applied as a coating to the inner surface of the plastic label.

6. A container as in claim 1 or 2 wherein the adhesive is dispersed within the plastic of the label.

7. A container as in claim 1 or 2 wherein the plastic that provides the barrier resistant to the transmission of fluids also functions as the adhesive at the inner surface of the label.

8. A container as in claim 1 wherein the adhesive is polyvinylidene cloride.

9. A plastic blow molded container comprising: a plastic side wall; a plastic label of uniform thickness having an outer surface that faces outwardly and an inner surface that faces inwardly toward the side wall; said label extending partially around the side wall and having side edges spaced from each other as well as upper and lower edges that extend between the side edges thereof; said side wall having abruptly curved portions adjacent the edges of the label to provide smooth junctions between the container side wall and the outer surface of the label at the label edges; said label being made of a plastic selected from the group consisting of: polyvinylidene cloride, polypropylene, polyethylene, ethyl vinyl alcohol, acrylonitrile or polyethylene terephthlate to provide a barrier resistant to transmission of fluids; and a heat sensitive adhesive that secures the inner surface of the label to the side wall.

10. A plastic blow molded container comprising: a plastic side wall having oppositely facing sides; a pair of plastic labels of uniform thickness on the oppositely facing sides of the side wall; each label having an outer surface that faces outwardly and an inner surface that faces inwardly toward the side wall; each label extending partially around the side wall and having side edges spaced from each other as well as upper and lower edges that extend between the side edges thereof; said side wall having abruptly curved portions adjacent the edges of the labels to provide smooth junctions between the container side wall and the outer surface of the labels at the label edges; each label being made of a plastic selected from the group consisting of: polyvinylidene cloride, polypropylene, polyethylene, ethyl vinyl alcohol, acrylonitrile or polyethylene terephthlate to provide a barrier resistant to transmission of fluids; and a heat sensitive adhesive that secures the inner surface of each label to the side wall.

* * * * *

UNITED STATES PATENT AND TRADEMARK OFFICE
CERTIFICATE OF CORRECTION

PATENT NO. : 4,662,528
DATED : May 5, 1987
INVENTOR(S) : William A. Slat

It is certified that error appears in the above-identified patent and that said Letters Patent is hereby corrected as shown below:

Column 1, line 59
"platic" to --plastic--;

Column 2, line 24
"rduce" to --reduce--;

Column 3, line 10
"one", insert --use--;

Column 3, line 17
"contianer" to --container--;

Column 4, line 44
"down" to --drawn--;

Column 5, line 21
"Ll" to --L1--; and

Column 5, line 38
"contianer" to --container--.

Signed and Sealed this

Fifteenth Day of March, 1988

*Attest:*

DONALD J. QUIGG

*Attesting Officer*   *Commissioner of Patents and Trademarks*